Dec. 30, 1958  E. W. PITZER  2,866,790
CATALYST AND DEHYDROGENATION PROCESS
Filed Feb. 18, 1957
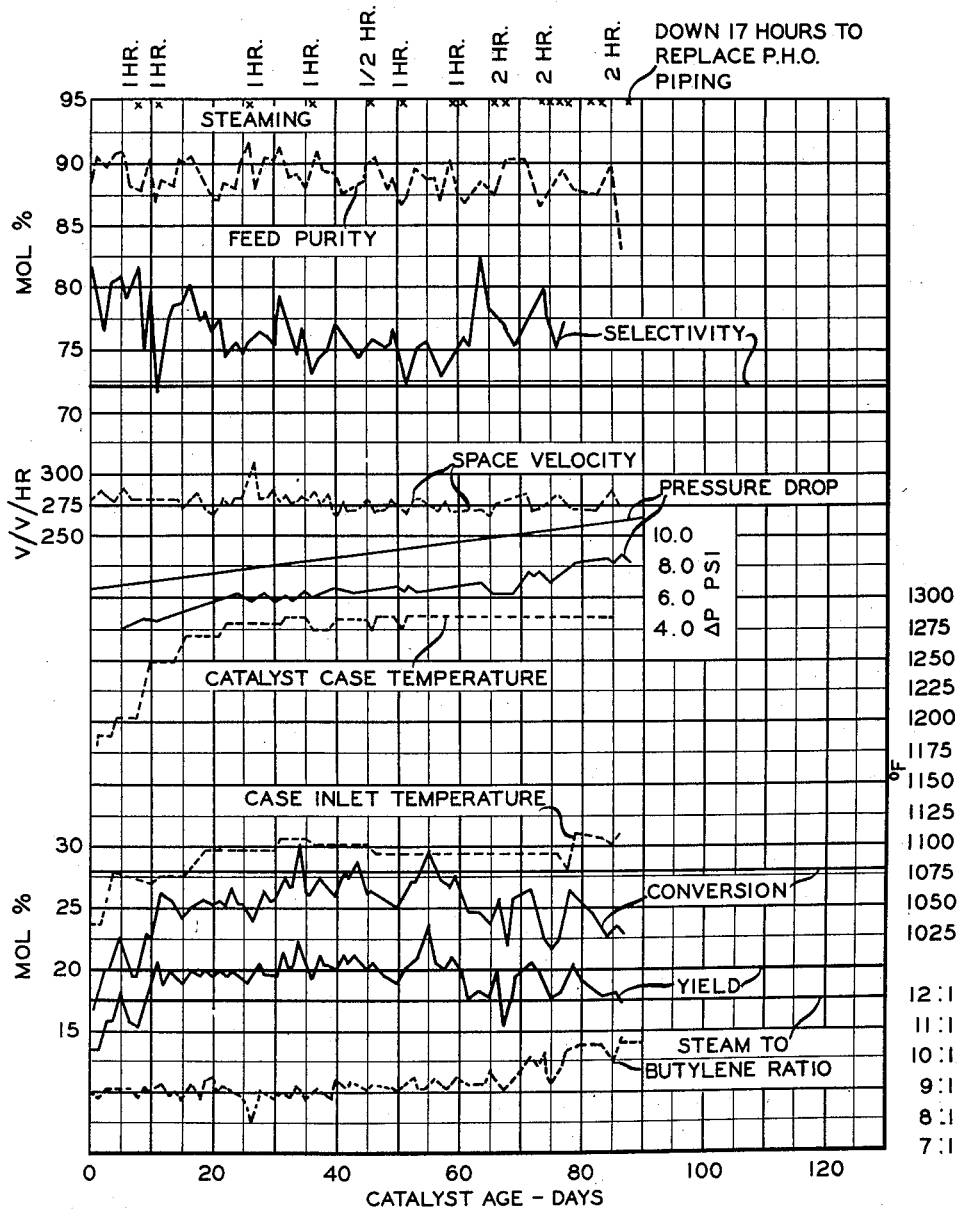
DATA ON CATALYST PERFORMANCE DEHYDROGENATION OF 1-BUTENE
STRAIGHT LINES ARE AVERAGES
FOR PRIOR ART CATALYST
INVENTOR.
E. W. PITZER
BY
ATTORNEYS United States Patent Office 2,866,790
Patented Dec. 30, 1958

2,866,790

CATALYST AND DEHYDROGENATION PROCESS

Emory W. Pitzer, Bartlesville, Okla., assignor to Phillips Petroleum Company, a corporation of Delaware Application February 18, 1957, Serial No. 640,920

19 Claims. (Cl. 260—290)

This invention relates to catalysts. In another aspect, it relates to a dehydrogenation process utilizing such catalysts. In still another aspect this invention relates to a dehydrogenation catalyst of great stability.

In the catalytic dehydrogenation of monoolefins, alkylpyridines, and alkyl aromatics to produce diolefins, alkenylpyridines and alkenyl aromatics, respectively, hereafter referred to as the specified dehydrogenation reactions, the first catalytic materials developed required periodic regeneration steps to remove the coke or carbonaceous material deposited on the catalyst during the dehydrogenation reaction. Later, catalysts were developed which were partially self-regenerating when the reactant materials were admixed with steam so that the operation could be carried out in a continuous manner with only occasional regeneration, say as little as one hour for each twenty-four hours of operation.

A typical catalyst of this type is an iron oxide catalyst containing a small amount of chromium oxide as a stabilizer and a small amount of potassium compound as a promoter. While yields, i. e., mols of product produced per 100 mols of feed charged on a once-through basis, are excellent with this type of catalyst, the selectivity, i. e., mols of product produced per 100 mols of feed destroyed, while satisfactory for many purposes leaves considerable room for improvement. It will be understood that, in a commercial plant employing large quantities of material, an increase in the order of one percentage point in selectivity provides a very substantial net increase in production because this increase, instead of being converted to unwanted and unsalable by-products, is converted to the desired product.

This is a continuation-in-part of my application Serial No. 531,026, filed August 29, 1955, now abandoned, for "Catalyst Dehydrogenation Process."

The drawing is a graph showing data on a full scale plant run wherein butene was dehydrogenated to butadiene-1,3 in the presence of the catalyst of this invention and shows an average curve for a catalyst of the type described, supra.

Despite the widely held view that the potassium compound in this type of catalyst functions only as a promoter of the water-gas reaction, i. e., is effective only in preventing deposition of coke by catalyzing the conversion carbon to its oxides, we have found that increased selectivity can be obtained where the potassium carbonate is the preponderant element of the catalyst and is present in an amount in excess of 50 percent. However, in order to obtain the desired increase in selectivity, other constituents of the catalyst must be held within certain rather narrowly defined ranges. In particular, iron oxide should be present in an amount of 39.0 to 47.0 percent by weight and chromium oxide should be present in an amount of 1.0 to 10.0 percent by weight. Also, the potassium carbonate content of the catalyst should be within the range of 51.0 to 59.0 percent by weight. Within these ranges of catalyst composition, a decided improvement in selectivity can be obtained which is quite significant in commercial plant operation. Also, the temperature required to attain a desired yield is considerably reduced, compared to the aforementioned typical catalyst which is available commercially, with resultant operating economics and improved catalyst life. I have also found that by use of this catalyst that I can obtain the same high yield and selectivity with lower steam to hydrocarbon ratio with the resulting savings in steam cost and removal, that less frequent reactivation by steaming is required, and longer catalyst life is obtainable.

Numerous methods for preparing this catalyst are available. For example, the catalyst components may be brought together in a mill, such as a hammer mill, and milled to break up the agglomerates to small size, the milled mixture pelleted and dried, and the catalyst used in the dehydrogenation process. Alternatively, the catalyst components can be formed into a paste with any suitable liquid, such as water or a dilute tannic acid solution, and extruded into any desired shape or size. Other methods involving coprecipitation, impregnation, and other known methods, may also be used with satisfactory results.

It will be obvious to those skilled in the art that rather than using iron oxide and chromia or chromium trioxide as starting materials, the metal nitrates may be used and thermally decomposed in the process of the preparation of the catalyst.

Various types of iron oxide are suitable for preparing the catalyst of the present invention. For example, the iron oxide may be prepared by the thermal decomposition of iron compounds, such as the oxalate or nitrate, or various types of commercial iron oxides can be employed. However, it is very advantageous to utilize an iron oxide wherein substantially all the particles have a size of two microns or less, and an average particle size of less than one micron, the catalyst being prepared without being subjected to a calcination treatment.

Such an iron oxide can be prepared by treatment of an iron salt, such as the chloride or sulfate, with a base, such as ammonia or sodium hydroxide, to precipitate iron hydroxide. An iron salt, such as the sulfate is added to the solution. The iron should be present in the oxidized state during treatment. One way to accomplish this purpose is to blow air through the solution for a period of 4 to 160 hours. A temperature of between 65° C. and the boiling point of the solution is maintained during the treatment, but a somewhat lower temperature, say 55° C., should be maintained during the addition of the iron salt. Advantageously, a zinc or copper catalyst can be added in which case the air blowing, if employed, can be carried out for a relatively short period, say 6 to 8 hours. In the absence of such catalyst, a longer time of treatment is required, say 48 to 110 hours. Also, where the solution is blown with air, metallic iron is advantageously present. The treatment is continued until a bright red iron oxide is obtained which is separated from the solution, as by filtration, and dried at temperatures of 400° F. or lower, i. e., substantially below those at which calcination would occur.

This method produces an iron oxide of improved characteristics for use in a dehydrogenation catalyst, since it is not heated to a calcination temperature, for example, 1500° F. Substantially all of the particles have a size of 2 microns or less and an average particle size of less than 1 micron, for example, 0.3 micron.

The characteristics of three iron oxides which are suitable for the preferred embodiments of the invention are as follows:

Iron oxide X:
- $Fe_2O_3$ —————————————————— 95.0% min.
- $H_2O$ @ 110° C —————————————— 0.2%.
- Specific gravity ————————————— 4.90.
- Wt. per sol. gal. (lbs.) ————————— 40.82.
- One pound bulks (gals.) ————————— 0.02450.
- Fineness thru 25 mesh ————————— 99% min.

Iron oxide Y:
- $Fe_2O_3$ —————————————————— 95.0% min.
- $H_2O$ @ 110° C —————————————— 0.2%.
- Specific gravity ————————————— 4.90.
- Wt. per sol. gal. (lbs.) ————————— 40.82.
- One pound bulks (gals.) ————————— 0.02450.
- Fineness thru 325 mesh ————————— 99%.

Iron oxide Z:
- $Fe_2O_3$ —————————————————— 95.0% min.
- $H_2O$ @ 110° C —————————————— 0.2%.
- Specific gravity ————————————— 4.90.
- Wt. per sol. gal. (lbs.) ————————— 40.82.
- One pound bulks (gals.) ————————— 0.02450.
- Fineness thru 325 mesh ————————— 99% min.

| Micron Diameter | Percent by weight below indicated Size | | |
|---|---|---|---|
| | Iron Oxide X | Iron Oxide Y | Iron Oxide Z |
| 3 | 100 | 100 | 100 |
| 2 | 100 | 100 | 99.5 |
| 1.5 | 100 | 99.2 | 99.0 |
| 1 | 100 | 97.8 | 98.5 |
| 0.8 | 99.2 | 97.0 | 96.1 |
| 0.6 | 97.0 | 89.2 | 82.8 |
| 0.4 | 71.7 | 43.4 | 31.4 |
| 0.15 | 4.8 | 3.2 | 2.9 |

In the preparation of one commercial catalyst according to the invention, the dried iron oxide is admixed with the proper proportions of potassium carbonate and chromium oxide. The mixture is ground twice in a hammer mill to obtain an intimate admixture of ingredients. A small amount of graphite is added to the mixture, after which it is passed through a 28 mesh screen for mixing purposes and formed into ¼" pellets. The material is then ground to a size of 40–100 mesh and formed into ⅛" pellets of 7 pounds strength as determined by exerting force on the side of the tablet. In many cases, the powdered material is heated to drive off moisture before the final pelleting operation. The finished pellets are heated at a temperature below the calcination temperature to afford a final drying; for example, for a period of 16 hours at 1000° F. This also effects at least a partial removal of the graphite.

This procedure for making the catalyst eliminates many practical difficulties heretofore encountered due to excessive die and punch wear upon the tableting equipment. This results, to an important degree, from utilizing the dry powders in the making of the catalyst. Therefore it is not necessary to provide excess crushing strength in the relatively moist tablets to compensate for the loss in strength resulting from removal of the moisture.

In the dehydrogenation process utilizing this catalyst in the production of diolefins from monoolefins, alkenylpyridines from alkylpyridines or alkenyl aromatics from alkyl aromatics, the reaction is carried out at high temperature and in the presence of steam. The temperature is ordinarily in the range of 1050 to 1300° F. With temperatures much below 1050° F. the conversion falls off rapidly and with temperatures much above 1300° F., the selectivity of the reaction decreases below the usual desirable limits. however, the catalyst can be employed at both lower and higher temperatures than those indicated. The steam diluent is utilized in the amount of 1 to 20 mols of steam per mol of monoolefin or alkyl aromatic charged. It is advantageous to maintain a pressure as low as feasible, and substantailly atmospheric pressure is ordinarily utilized. However, elevated pressures are operable.

Monoolefins most commonly used in producing diolefins of the same number of carbon atoms are butenes and pentenes, butadiene and pentadiene being the products of the process. Also, the dehydrogenation of ethylbenzene to styrene, the dehydrogenation of methylbutene to isoprenes, e. g., 2-methylbutene to isoprene, and the dehydrogenation of 2-methyl-5-ethylpyridine to 2-methyl-5-vinylpyridine are important applications of the invention. However, the process is applicable generally to monoolefins and diolefins, although monoolefins of 8 or less carbon atoms and alkyl benzenes or alkylpyridines with 1 to 4 alkyl groups each having 6 or less carbon atoms with at least one alkyl group of two or more carbon atoms are most applicable from the standpoint of yield, selectivity and economics.

The process is ordinarily carried out by forming a preheated mixture of the monoolefin and steam, passing the charge mixture over the catalyst at the desired temperature and recovering the product from the reaction mixture coming from the catalyst cases. Recycle of unconverted monoolefin is utilized in substantially all applications. The catalyst chambers may be adiabatic or isothermal, although isothermal reactors are more desirable from a processing standpoint.

It will be understood by those skilled in the art that overall yield per pass of butadiene is the product of the present conversion times the selectivity. The term "yield" as used herein refers to yield per pass of butadiene unless otherwise specified. In general, the operating conditions of temperature, space velocity, etc., will be chosen to obtain a given yield consistent with economic considerations. Having chosen the desired yield, the greater the selectivity, the greater the ultimate yield of desired product per unit of raw material. Also, it is desirable to operate at as low a temperature as practical to obtain the desired yield per pass. Low temperature operation provides two primary advantages, one being lower heat cost and the other being a longer catalyst life because there is greater range available for temperature adjustment as catalyst activity declines.

EXAMPLES

The catalyst for all of these tests was prepared by mixing and grinding the ingredients in a hammer mill; stirring into the mixture 5 to 8 percent of 2.4 percent aqueous tannic acid solutions; sieving through a 20-mesh sieve; pelleting to ⅛ inch pills; drying at 300° F. in air for 24 hours; raising the temperature to 1100° F. at a uniform rate of 200° F. per hour and maintaining this temperature for 24 hours; cooling and charging a measured quantity to the reactor.

Each test was started by heating the reactor and catalyst in air to about 1100° F., passing steam over the catalyst and shutting off the air, and then starting the hydrocarbon flow and increasing the temperature to the desired level.

*Example I*

A run was made to compare the catalyst of this invention designated as A having a composition of 44.6 percent $Fe_2O_3$—52.2 percent $K_2CO_3$—3.2 percent $Cr_2O_3$ with a catalyst designated as B having a composition of 62.4 percent $Fe_2O_3$—35.2 percent $K_2CO_3$—2.4 percent $Cr_2O_3$ in converting 2-butene to butadiene. Both catalysts utilized iron oxide X previously described. Yields are shown as mols of butadiene, per 100 mols of 2-butene in the feed. The runs were operated at atmospheric pressure, space velocity of 400 and at a temperature of 1150° F.

| Catalyst Age, Days | Before or After Steaming | | Steam to Hydrocarbon Ratio | | | |
|---|---|---|---|---|---|---|
| | | | 6:1 | | 12:1 | |
| | | | A | B | A | B |
| 1 | Before | Yield | 19.3 | 14.7 | 12.4 | |
| | | Selectivity | 82.3 | 71.5 | 85.5 | |
| 5 | do | Yield | 21.7 | 15.3 | 19.0 | |
| | | Selectivity | 82.7 | 78.9 | 85.2 | |
| 6 | After | Yield | 20.5 | 12.8 | 16.9 | |
| | | Selectivity | 83.5 | 70.8 | 84.5 | |
| 8 | Before | Yield | 20.1 | 10.1 | 20.3 | 22.8 |
| | | Selectivity | 83.6 | 70.2 | 80.9 | 82.9 |
| 9 | After | Yield | 20.3 | 12.3 | 19.3 | 19.1 |
| | | Selectivity | 81.5 | 60.2 | 79.1 | 86.4 |
| 20 | Before | Yield | 18.8 | 12.2 | | |
| | | Selectivity | 83.8 | 78.1 | | |
| 21 | After | Yield | 19.6 | 11.7 | | |
| | | Selectivity | 76.1 | 67.1 | | |
| 29 | Before | Yield | 20.8 | 8.1 | 20.1 | 19.7 |
| | | Selectivity | 75.4 | 72.4 | 95.3 | 88.7 |
| 30 | After | Yield | 20.6 | 8.8 | 20.8 | 20.2 |
| | | Selectivity | 82.3 | 53.7 | 86.7 | 87.1 |

While the above data immediately show the superiority of my catalyst over the low potassium catalyst at the low steam to hydrocarbon ratio, a closer examination also shows that less frequent steaming is required. For example, the low potassium catalyst shows improved selectivity after each steaming while my catalyst showed a tendency to be temporarily poisoned by steaming. This clearly indicates that steaming should be minimized and resorted to only when the catalyst activity falls off. This will be further brought out in conjunction with the discussion of a plant run later described.

*Example II*

Two additional catalysts were prepared by the above-described method designated as C and D with the following compositions:

Catalyst C—45.0 $Fe_2O_3$—52.6 $K_2CO_3$—2.4 $Cr_2O_3$
Catalyst D—44.6 $Fe_2O_3$—52.2 $K_2CO_3$—3.2 $Cr_2O_3$ These catalysts were tested in converting 2-butene to butadiene as described in Example I. The data after two days of operation after steaming are shown below:

| Operating Temp., °F | C | | D | |
|---|---|---|---|---|
| | Yield | Selectivity | Yield | Selectivity |
| 1,130 | 14.2 | 90.4 | 17.1 | 85.5 |
| 1,150 | 17.9 | 88.6 | 21.4 | 81.4 |
| 1,170 | 22.9 | 85.4 | 26.3 | 80.9 |
| 1,190 | | | 27.2 | 81.7 |

These data are given to show that catalyst of varying compositions within the claimed range gives good yields and selectivity.

*Example III*

A full scale plant run for 130 days was made using the catalyst of my invention consisting of 44.6 percent $Fe_2O_3$; 52.2 percent $K_2CO_3$; 3.2 percent $Cr_2O_3$ in converting of 0.8 percent ethane, 1.0 percent propylene, 0.4 percent propane, 1.1 percent butadiene, 2.0 percent iso-butylene, 88.0 percent n-butenes, 6.3 percent butane, 0.4 percent $C_5+$. The butenes consisted of a mixture of about ⅓ butene-1 and ⅔ butene-2. The data are plotted in the attached drawings. An average line is shown for the previously used commercially prepared catalyst consisting of 67 percent $Fe_2O_3$, 3 percent $Cr_2O_3$ and 30 percent $K_2CO_3$. Feed purity, catalyst case temperature and case inlet temperatures are substantially the same for both catalysts. The catalyst is heated by controlling the jacket or case temperature and no temperatures of catalyst were obtained. An analysis of these data or drawings give better selectivity and therefore converts less feed per pass for the same yield. The lower pressure drop means less power consumption and also provides for longer catalyst life. For the first 59 days, the period between steaming averaged about 7 days. For the previously used catalyst, one hour steaming is required each day. On the 59th day, an operating difficulty developed and the catalyst was permanently damaged. Continued periodic operating difficulties occurred between the 59th and 77th days, which still further permanently damaged the catalyst. During this period, steaming of the catalyst, somewhat more frequently than during the first 59 days, resulted in temporary, partial restoration of catalyst activity following each steaming, as is shown by the graph. After about the 90th day, operation of the unit was again lined out; as a result, the frequency of steaming required approached that used in the first 59 days, selectivity approached the high values of the first 59 days, but the yield remained at the reduced level shown on the graph for the last few days. This level was still suitable for commercial operations even after the damage. In the present commercial scale run, the catalyst has been operating over 100 days without steaming.

*Example IV*

An iso-olefin 2-methylbutene-2 was passed over 18.1 grams (10 cc.) of a catalyst of the composition of catalyst A of Example I in a stainless steel reactor at a hydrocarbon liquid hourly space velocity of 2.35 along with 14.8 weight parts of steam for each part of hydrocarbon. The temperature of the reaction chamber was 1200° F. The effluent from the reactor was cooled to 113° F. thereby condensing most of the steam. The gas stream was then dried in a drying tube and analyzed by mass spectographic methods. The data obtained are given below:

$C_4$ and lighter, mol percent _____ 8.25
$C_5$ olefins, mol percent _____ 68.70
Isoprene, mol percent _____ 22.74
Conversion per pass, mol percent _____ 30.44
Yield per pass, mol percent _____ 23.71
Efficiency, mol percent _____ 77.88

These data show that the catalyst can also be used with good results in producing isoprene from 2-methylbutene-2. The data also show the stability of the catalyst of the invention and the less frequent steaming required.

*Example V*

Two runs were made using a catalyst consisting of 44.6 percent $Fe_2O_3$; 52.2 percent $K_2CO_3$ and 3.2 percent $Cr_2O_3$ in the dehydrogenation of 2-methyl-5-ethylpyridine to 2-methyl-5-vinylpyridine. The catalyst had been in daily use for a total of 101 hours with daily steaming prior to each day's run at the time these runs were made. Each of the runs was for a total of 6 hours. The data are given below:

| Run | Temperature, °F. | LHSV | Steam/HC Cat. ratio | Pressure, Atmosphere | Yield, mol percent/pass | Efficiency |
|---|---|---|---|---|---|---|
| 1 | 1,108–1,117 | 1.80 | 6.1:1 | 1 | 28.3 | 86 |
| 2 | 1,158–1,164 | 1.79 | 6.2:1 | 1 | 39.8 | 80.4 |

These data clearly show that the catalyst is effective in dehydrogenating alkyl substituted ring compounds.

I claim:

1. A method of dehydrogenating a compound selected from the group consisting of monoolefins, alkylpyridines and alkyl aromatics which comprise passing the vapors of said compound into contact with a catalyst consisting essentially of 51.0 to 59.0 percent by weight potassium carbonate, 39.0 to 47.0 percent by weight iron oxide and 1.0 to 10.0 percent by weight chromium oxide.

2. In the dehydrogenation of butenes, the steps which comprise contacting a mixture of said butenes and steam with a catalyst consisting essentially of 51.0 to 59.0 percent by weight potassium carbonate, 39.0 to 47.0 percent by weight iron oxide and 1.0 to 10.0 percent by weight chromium oxide.

3. In the dehydrogenation of ethylbenzene, the steps which comprise contacting a mixture of said ethylbenzene and steam with a catalyst consisting essentially of 51.0 to 59.0 percent by weight potassium carbonate, 39.0 to 47.0 percent by weight iron oxide and 1.0 to 10.0 percent by weight chromium oxide.

4. In the dehydrogenation of 2-methyl-5-ethylpyridine, the steps which comprise contacting a mixture of said 2-methyl-5-ethylpyridine with a catalyst consisting essentially of 51.0 to 59.0 percent by weight potassium carbonate, 39.0 to 47.0 percent by weight iron oxide and 1.0 to 10.0 percent by weight chromium oxide.

5. In the dehydrogenation of 2-methylbutene-2, the steps which comprise contacting a mixture of said 2-methylbutene-2 with a catalyst consisting essentially of 51.0 to 59.0 percent by weight potassium carbonate, 39.0 to 47.0 percent by weight iron oxide and 1.0 to 10.0 percent by weight chromium oxide.

6. A method of dehydrogenating a compound selected from the group consisting of monoolefins, alkylpyridines and alkyl aromatics which comprises passing the vapors of said compound together with 1 to 20 mols of steam per mol of monoolefin charged into contact with a catalyst consisting essentially of 51.0 to 59.0 percent by weight potassium carbonate, 39.0 to 47.0 percent by weight iron oxide and 1.0 to 10.0 percent by weight chromium oxide, at a temperature within the range of 1050 to 1300° F.

7. In the dehydrogenation of 2-methyl-5-ethylpyridine, the steps which comprises contacting 2-methyl-5-ethylpyridine and steam in the amount of 1 to 20 mols of steam per mol of 2-methyl-5-ethylpyridine charged with a catalyst consisting essentially of 51.0 to 59.0 percent by weight potassium carbonate, 39.0 to 47.0 percent by weight iron oxide and 1.0 to 10.0 percent by weight chromium oxide, at a temperature within the range of 1050 to 1300° F.

8. The method of claim 6 wherein the catalyst is formed by mixing the components in a mill to break up the agglomerated to small sizes, pelleting and drying the resulting pilled mixture.

9. The method of claim 6 wherein the catalyst is formed by thermally decomposing iron nitrate, calcium nitrate, and chromium nitrate in the proper proportions as to provide the catalyst specified by claim 12.

10. The process of dehydrogenating 2-butene which comprises contacting 2-butene together with about 12 mols of steam per mol of 2-butene with a catalyst consisting essentially of 51.0 to 59.0 percent by weight potassium carbonate, 39.0 to 47.0 percent by weight iron oxide and 2.0 to 3.7 percent by weight chromium oxide, at a temperature of about 1130° F., a pressure of one atmosphere, and a space velocity of 400, and recovering butadiene as a product.

11. A method of dehydrogenating a compound selected from the group consisting of monoolefins, alkylpyridines and alkyl aromatics which comprises charging a catalyst consisting essentially of 51.0 to 59.0 percent by weight potassium carbonate, 39.0 to 47.0 percent by weight iron oxide and 2.0 to 3.7 percent by weight chromium oxide, at a temperature of about 1130° F., a pressure of one atmosphere, and a space velocity of 400, to a catalytic conversion zone, and passing vapors of said hydrocarbon together with steam through the conversion zone in contact with the catalyst therein.

12. A catalyst consisting essentially of 51.0 to 59.0 percent by weight potassium carbonate, 39.0 to 47.0 percent by weight iron oxide and 1.0 to 10.0 percent by weight chromium oxide.

13. A catalyst composed of 44.6 percent by weight iron oxide, 52.2 percent by weight potassium carbonate and 3.2 percent by weight chromium oxide.

14. A catalyst composed of 45.0 percent by weight iron oxide, 52.6 percent by weight potassium carbonate and 2.4 percent by weight chromium oxide.

15. A catalyst composed of 40.0 percent by weight iron oxide, 56.5 percent by weight potassium carbonate and 3.5 percent by weight chromium oxide.

16. The method of claim 6 wherein the catalyst is formed by forming the catalyst components into a paste, and extruding them into a desired size and shape.

17. A method of dehydrogenating a compound selected from the group consisting of monoolefins, alkylpyridines and alkyl aromatics which comprise passing the vapors of said compound into contact with a catalyst consisting essentially of 51.0 to 59.0 percent by weight potassium carbonate, 39.0 to 47.0 percent by weight iron oxide and 1.0 to 10.0 percent by weight chromium oxide, said iron oxide being prepared by heating a solution containing precipitated iron oxide at a temperature below the boiling point of the solution, said iron oxide having an average particle size of less than 1 micron and substantially all the particles being less than 2 microns in size.

18. A method of dehydrogenating a compound selected from the group consisting of monoolefins, alkylpyridines and alkyl aromatics which comprises passing the vapors of said compound into contact with a catalyst composed of 44.6 percent by weight iron oxide, 52.2 percent by weight potassium carbonate and 3.2 percent by weight chromium oxide.

19. In the dehydrogenation of butenes, the steps which comprise contacting a mixture of butenes and steam with a catalyst composed of 44.6 percent by weight iron oxide, 52.2 percent by weight potassium carbonate and 3.2 percent by weight chromium oxide.

References Cited in the file of this patent

UNITED STATES PATENTS

| | | |
|---|---|---|
| 2,414,585 | Eggertson et al. | Jan. 21, 1947 |
| 2,426,829 | Kearby | Sept. 2, 1947 |
| 2,603,610 | Amos et al. | July 15, 1952 |
| 2,666,086 | Pitzer | Jan. 12, 1954 |
| 2,769,811 | Mahan | Nov. 6, 1956 |
| 2,775,637 | Lanning et al. | Dec. 25, 1956 |